Nov. 12, 1968    R. W. FREET ET AL    3,410,385
VENDING MACHINE

Filed July 3, 1967    6 Sheets-Sheet 1

INVENTORS
ROBERT W. FREET
THOMAS G. FREET

BY *Beale and Jones*

ATTORNEYS

Nov. 12, 1968   R. W. FREET ET AL   3,410,385
VENDING MACHINE
Filed July 3, 1967   6 Sheets-Sheet 2
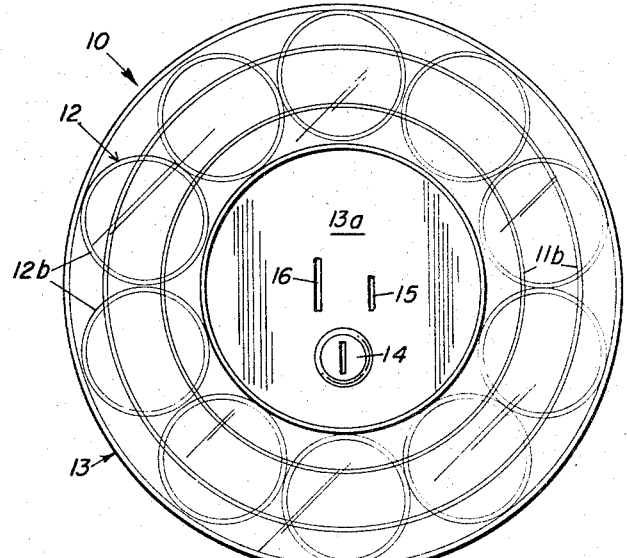
FIG.3
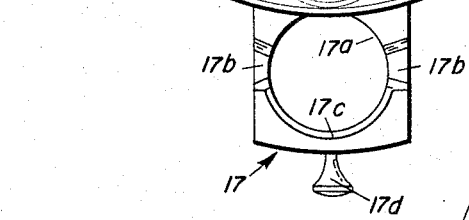
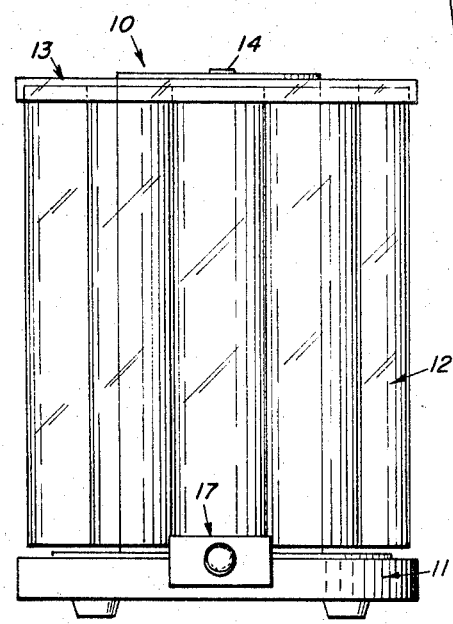
FIG.5
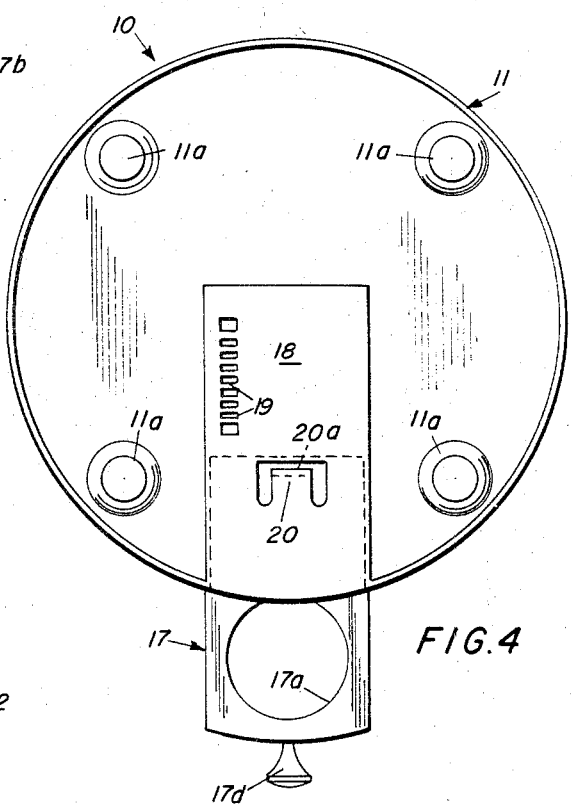
FIG.4
INVENTORS
ROBERT W. FREET
THOMAS G. FREET
BY Beale and Jones
ATTORNEYS

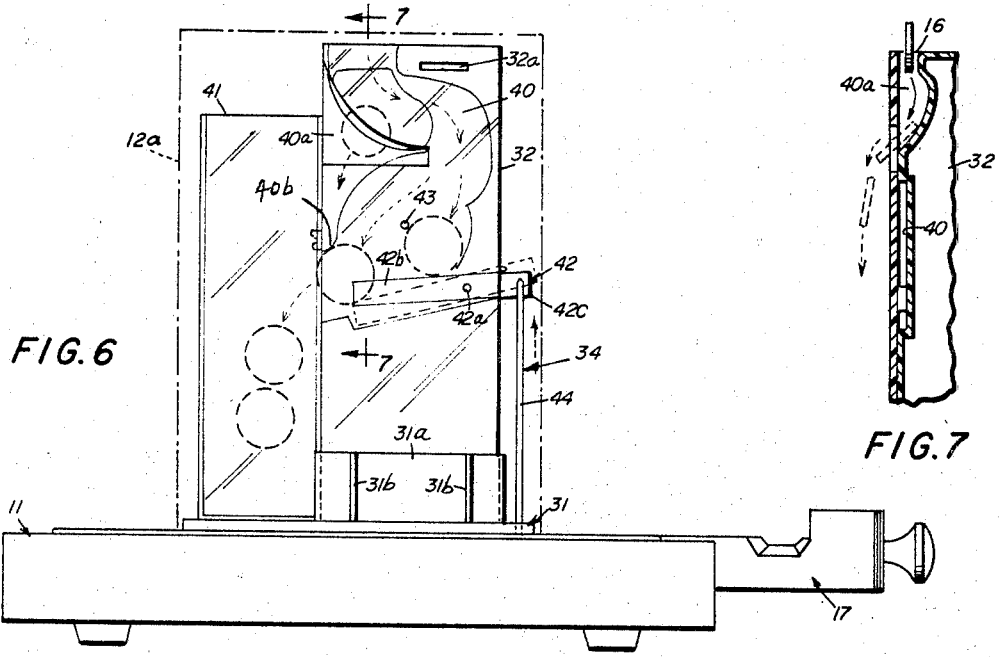
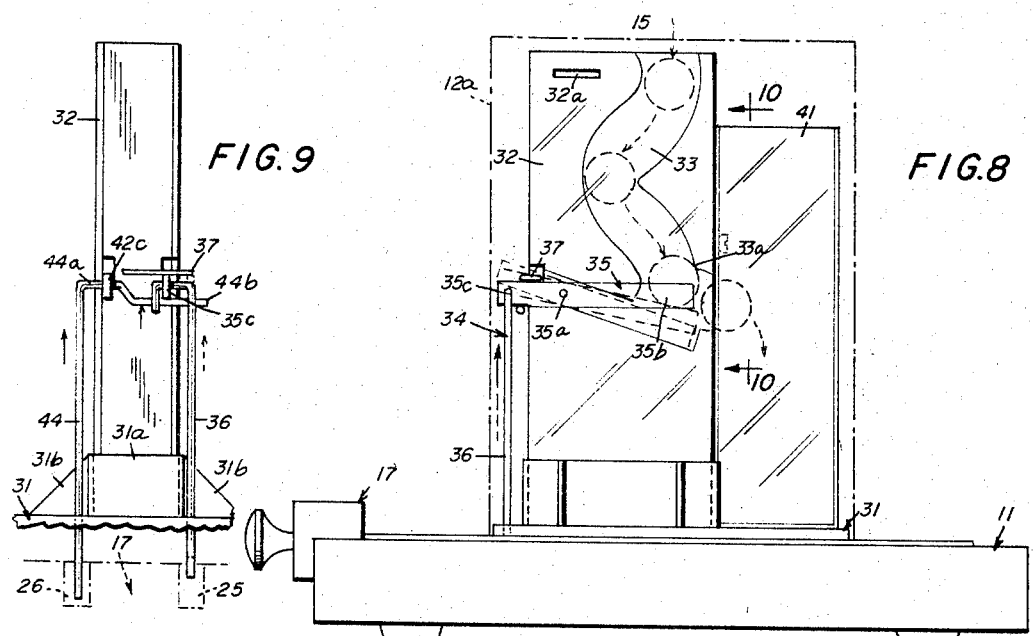
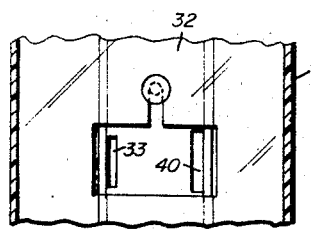

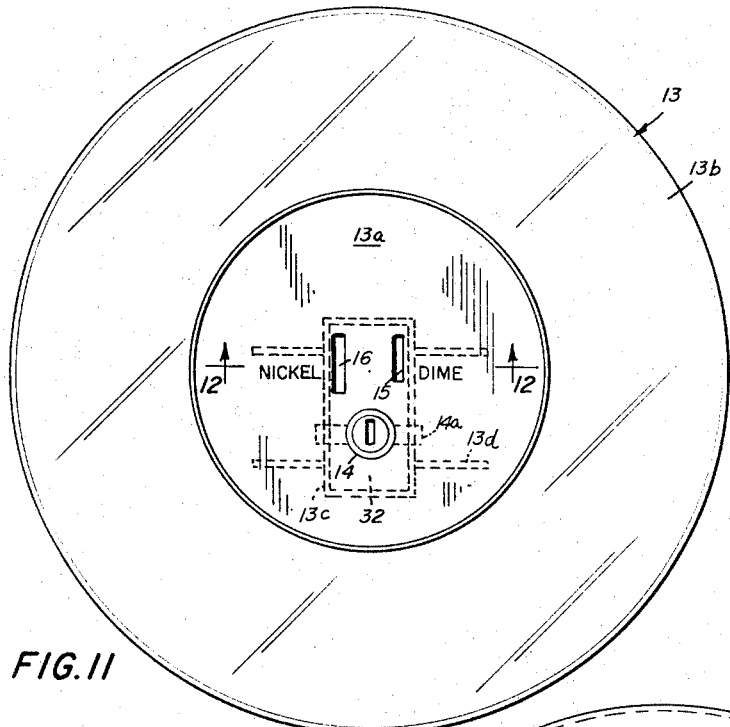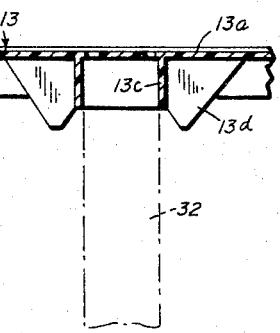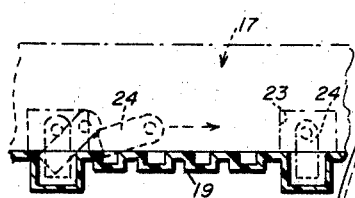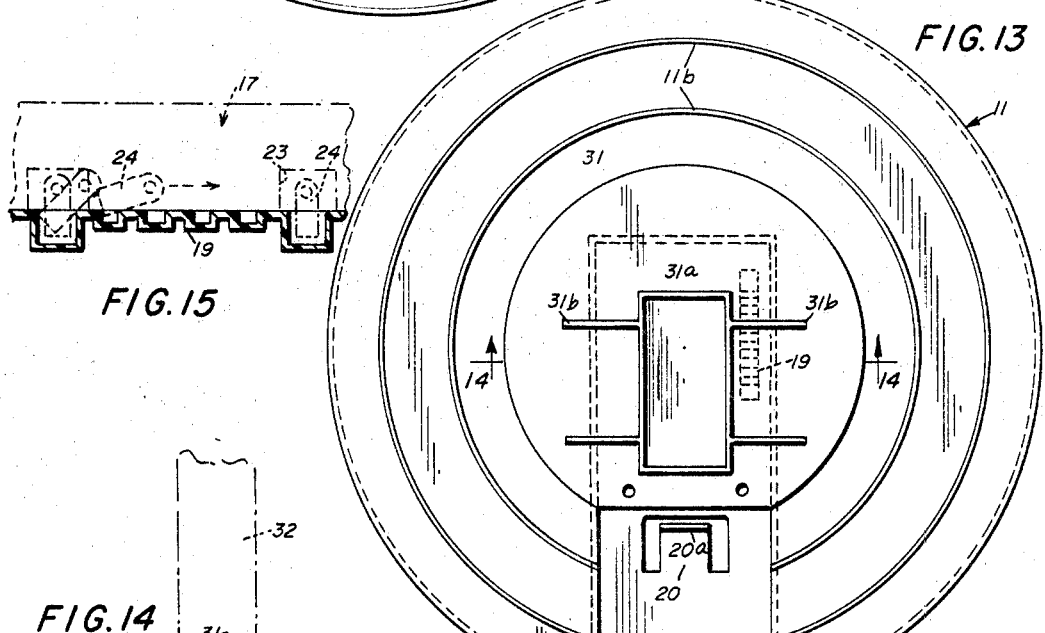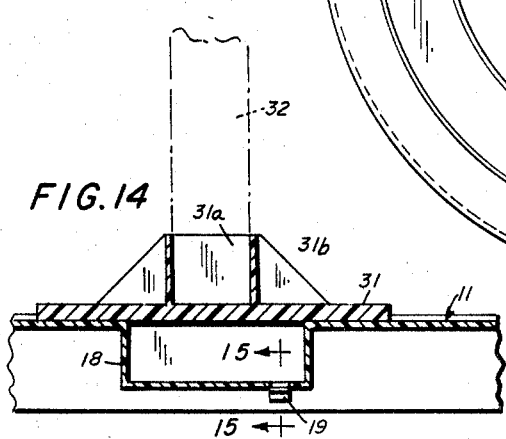

Nov. 12, 1968  R. W. FREET ET AL  3,410,385
VENDING MACHINE
Filed July 3, 1967  6 Sheets-Sheet 5

INVENTORS
ROBERT W. FREET
THOMAS G. FREET
BY *Beale and Jones*
ATTORNEYS

United States Patent Office 3,410,385
Patented Nov. 12, 1968

3,410,385
VENDING MACHINE
Robert W. Freet and Thomas G. Freet, both of
R.D. 1, Box 397, Etters, Pa. 17319
Filed July 3, 1967, Ser. No. 650,685
6 Claims. (Cl. 194—39)

ABSTRACT OF THE DISCLOSURE

A check controlled dispenser for small flat cuplike articles stored in transparent vertical tubes arranged in an annular manner and rotatable to a dispensing position about a central tower mounted on a base. The base has a radially extending article receiving slide to receive an article under one of the vertical tubes brought into dispensing position thereabove. The central tower supports a removable locked on transparent top having two different slots to receive checks of different size to operate the machine, such as one dime for one and two nickels for the other. The tower has a wrong check rejector for each denomination of check and check passages leading to check receiving pivoted arms connected with lock means for the dispensing slide. Passages in the tower lead to a check collecting container positioned adjacent the tower. The lock means for the slide includes a vertically extending rod connected with one of the check receiving pivoted arms that is moved vertically out of a recess in the slide by a check of one size or by a cross connection means from the other check receiving pivoted arm. The other check receiving pivoted arm is connected to a vertically extending rod that rides in a camming ramp in the slide so that on unlocking of the slide it is permitted to be slid inward to an article pick-up position and the camming ramp moves the vertical rod riding thereon upward to pivot the check receiving pivoted arms to pivot further so as to release the checks resting thereon and permitting them to roll into the check collecting container.

FIELD OF INVENTION

This invention relates to a check-controlled article vending machine having rotatably mounted stacked source supplies, rotatable relative to a common outlet, with means assuring alignment of the stacked source and a dispensing outlet and having check-controlled lock release article delivery by a radially sliding carrier.

DESCRIPTION OF THE PRIOR ART

U.S. Patent 462,024, issued in 1891, shows a coin-operated vending machine in which a lever $f$ normally prevents movement of a dispensing pusher $f^1$ shown in FIG. 5 of the patent. When a coin falls onto the lever, the lever is tilted to the position shown in FIG. 6 of the patent. This permits the pusher $f^1$ to move to the right and thus causes dispensing of an article and further movement of the lever so the coin will fall into the coin receptacle.

U.S. Patent 3,162,287 of 1964 discloses a vending machine with a rotatable magazine for the articles to be dispensed and a coin-controlled swingable pusher to dispense an article from the bottom of a selected stack of the magazine.

Applicant provides in such a type of vending machine, a novel coin control of two denominations, for example, nickels and dimes, that positively operates a lock release of a radially movable in and out slidable dispenser which slide dispenser movement in the in direction to article loading position trips the coin lock release mechanism to release the coin to a coin receptacle. There is provided in the slide dispenser a slidable retractable barrier member that prevents an article from becoming jammed in its downward movement onto the slide dispenser. The coin control mechanism provides a tamper proof vending machine.

Summary

This vending machine has provided therein a compact multiple article selection, positive acting, jam free article, coin controlled lock release of dispensing slide with slide movement causing coin drop and reset of the lock release mechanism. It lends itself to ease of fabrication such as from plastic material and is relatively inexpensively produced and maintained.

For a more complete understanding of the nature and scope of the invention reference is made to the drawings, description and claims.

FIG. 3 is a top plan view of the machine with dispensing slide pulled out;

FIG. 4 is a bottom plan view of FIG. 3;

FIG. 5 is a front elevational view of FIG. 3;

FIG. 6 is a side elevation on an enlarged scale similar to FIG. 2 with the top and storage unit removed showing one size of checks which requires two to operate the lock means;

FIG. 7 is an enlarged sectional view on line 7—7 of FIG. 6 showing the coin rejection chute;

FIG. 8 is an opposite view from that shown in FIG. 6 and showing another size of checks which only requires one to operate the lock means;

FIG. 9 is an elevational fragmentary view showing the check operating means as viewed at the left of FIG. 8;

FIG. 10 is a sectional view of line 10—10 of FIG. 8 showing the discharge slots for the two different sizes of checks;

FIG. 11 is a top plan view of the transparent cover removed from FIG. 3 on an enlarged scale;

FIG. 12 is a sectional view on line 12—12 of the cover in FIG. 11 showing the slots for the different checks or coin and the cap structure that fits on top of the vertical tower that conducts the checks or coin;

FIG. 13 is a top plan view of the base of the machine;

FIG. 14 is a sectional view on line 14—14 of FIG. 13 of the base;

FIG. 15 is a sectional view of the base along line 15—15 of FIG. 14 showing the means to prevent reverse movement of the dispensing slide in the base;

Figure 23:
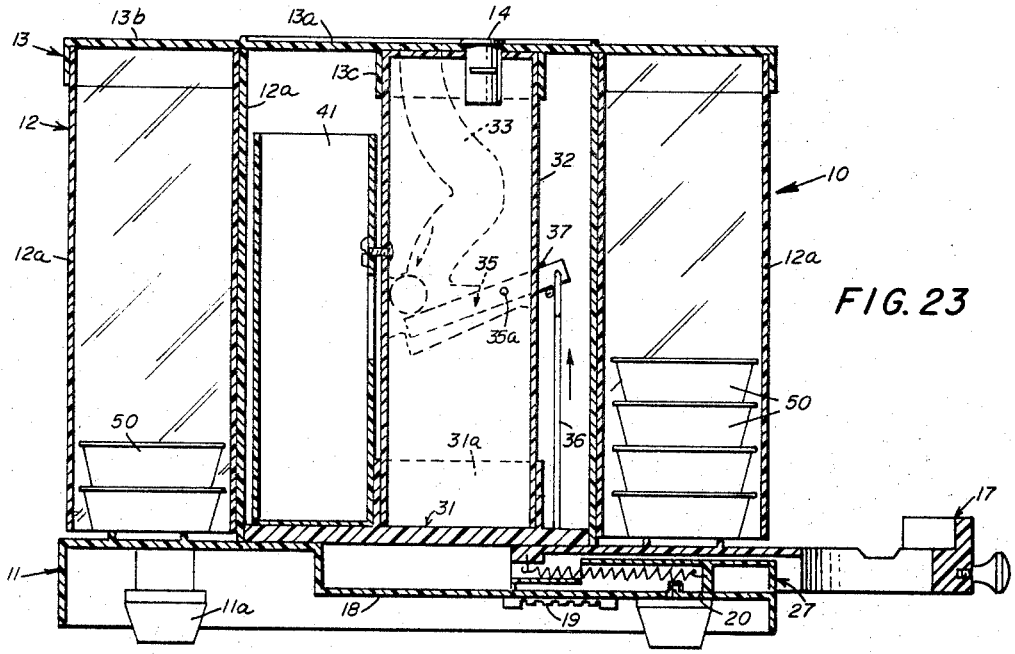
FIG. 23 is a vertical mid-sectional view of the dispensing machine showing dispensing slide pulled to out position and a check or coin in position raising up the lock means permitting the dispensing slide to now be pushed inward.
Figure 24:
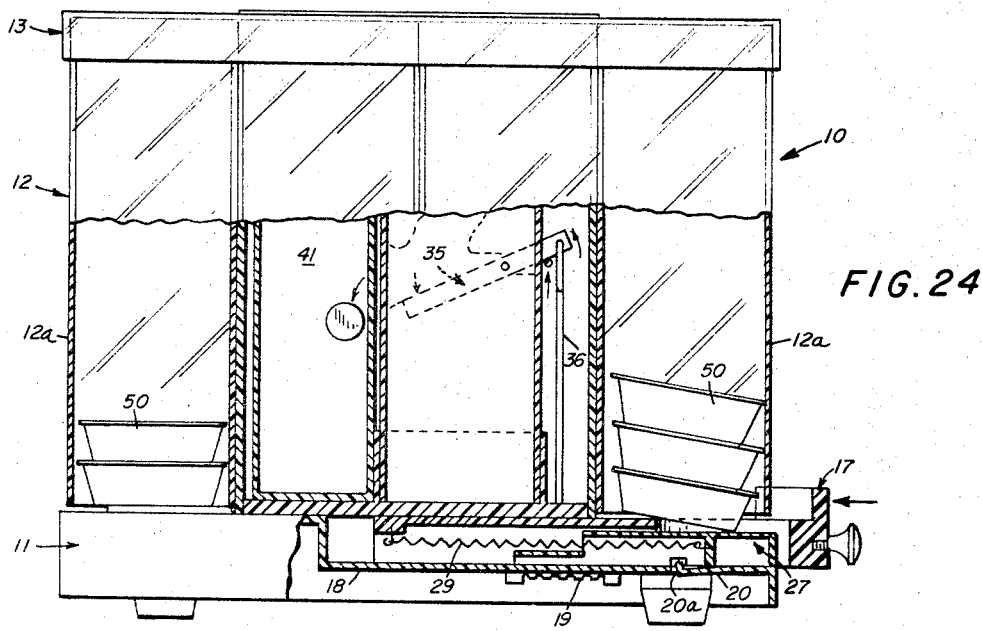
Figure 25:
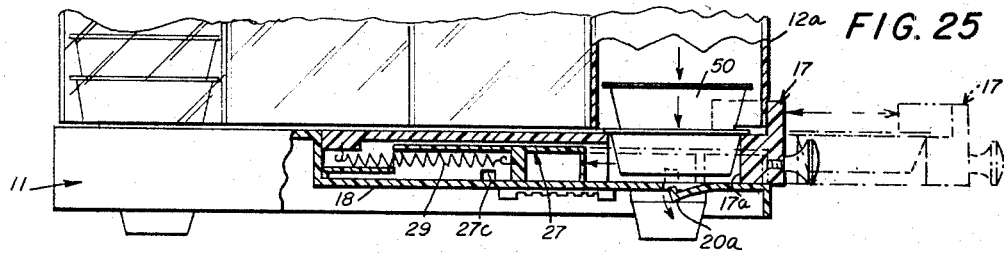

FIG. 24 is a view of the machine of FIG. 23 with the dispensing slide moved inward to nearly full in position with an article to be dispensed next resting partly on the slide and the retractable barrier member; and FIG. 25 is a view similar to the machine in FIG. 24 with the slide dispenser fully pushed inward in the machine, the barrier member having been released and slid to the left permitting an article to drop into the dispensing slide.

The type of article, for example, being dispensed is shown at 50 in FIGS. 23, 24 and 25. It is a relative shallow cup-shaped container that may be made of aluminum and has a readily easy peal off top. Instant powder mix for coffee, tea, chocolate drink and the like may be packaged. The powder content of the dispensed packages would be used with hot water or other liquid. Packages containing liquid could likewise be dispensed. Other articles could likewise be dispensed and the vending machine is not limited to these described articles.

A vending machine is generally indicated at 10 for dispensing the article 50 such as shown in FIGS. 23, 24 and 25. The vending machine may be built in various sizes and the one illustrated is a table or desk type. A base 11 is here shown in circular form having feet 11a and a radially extending recess to receive a dispensing slide 17 for dispensing the articles 50. This base is formed with annular ribs 11b, see FIG. 13, in its upper face. A rotatably mounted storage member 12 is supported on the base and is made up of a central cylindrical member 12a having attached about its periphery vertically extending tubular housings 12b. The tubular housings 12b are transparent while the central cylindrical member 12a may be opaque. A removable top 13 is received on the storage compartment 12 and has a central circular opaque member 13a surrounded by an annular transparent top portion 13b which has a depending peripheral skirt in its outer edge and at its bottom center portion a depending rectangular collar 13c, see FIG. 12, to receive the top of a tower 32 to be described. This rectangular collar 13c has supporting ribs 13d. In the top portion 13a are coin slots 15 and 16 respectively for dimes and nickels and a suitable key operated lock 14 for securing the top to the tower as will be described.

The transparent tubular housings 12b permit viewing of the articles to be dispensed. The storage 12 is rotatable about a circular base plate 31 on the top central portion of base 11 as shown in FIGS. 14 and 23–25. The lock 14 has a keeper portion 14a, see FIG. 11, which locks in suitable slots 32a, see FIG. 6, in the tower 32.

A dispensing slide 17 is received in the recess 18 in the base as shown in a number of the figures. This slide 17 is locked in out position and by suitable coin operated locking means to be described, is released for inward sliding movement under a selected tubular housing 12b to receive an article 50 such as shown in FIG. 25 so as to dispense the same. These articles 50 are gravity fed into a recess 17a in the slide which has diametrically disposed apertures 17b for finger grasp of the rim of the article 50, see FIG. 25. The slide 17 has an arcuate portion 17c which assures rotary alignment of the selected tube 12b carrying the selected article or articles to be dispensed. A suitable know 17d for finger grasp pushing and pulling of the slide is provided.

Figure 1:
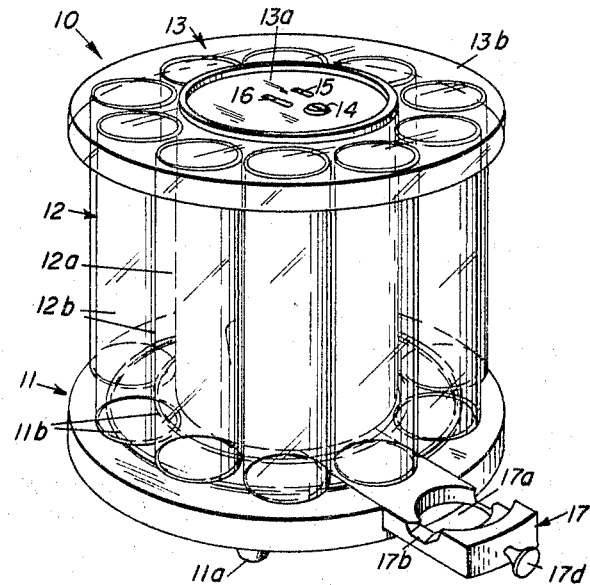
FIG. 1 is a front perspective view of the machine with the dispensing slide in out position.
Figure 2:
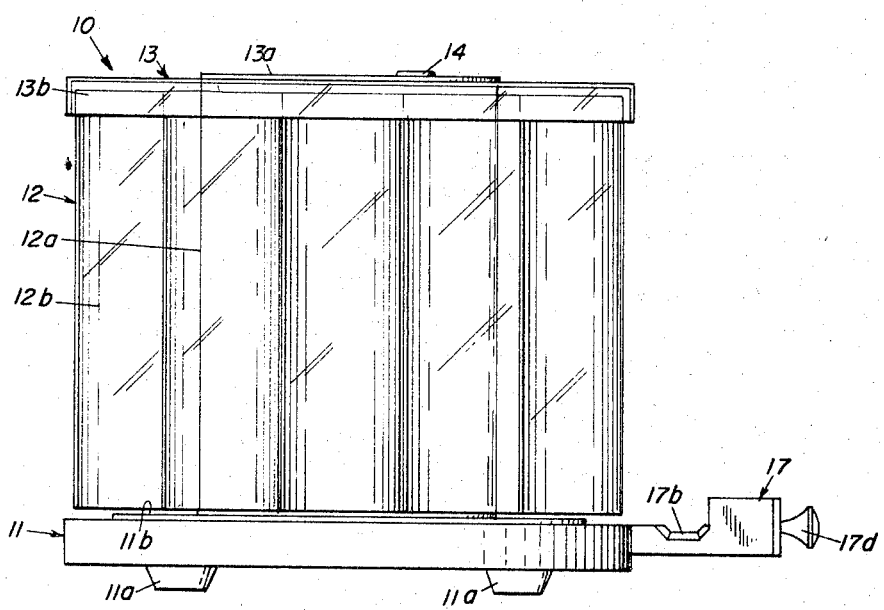
FIG. 2 is a side elevation as viewed from approximately the left side of FIG 1.
Figure 16:
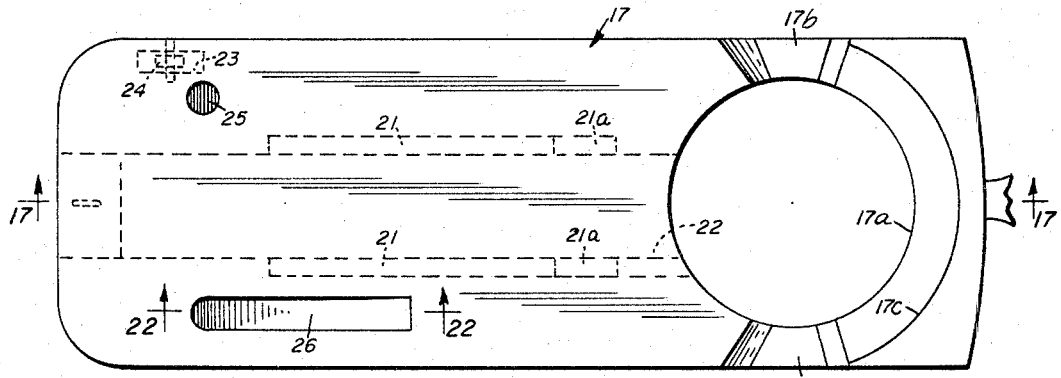
FIG. 16 is a top plan view of the dispensing slide removed from FIG. 1 on an enlarged scale.
Figure 17:
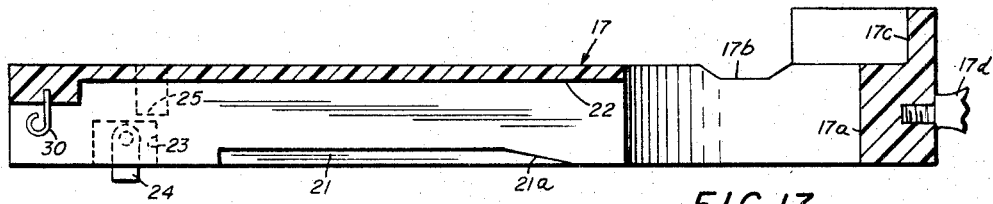
FIG. 17 is a sectional view of the slide along line 17—17 of FIG. 16.
Figure 18:
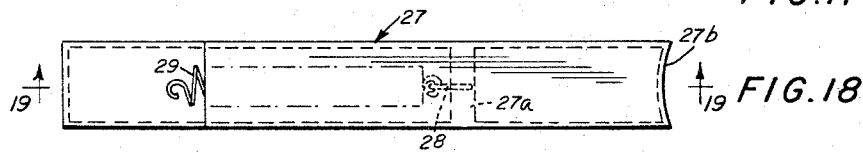
FIG. 18 is a top plan view of a barrier member that slides in the central portion of the slide member of FIGS. 16 and 17.
Figure 19:
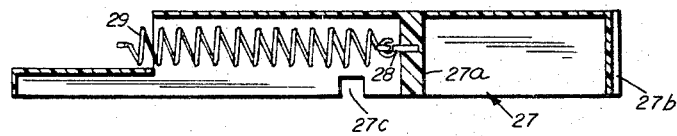
FIG. 19 is a sectional view along line 19—19 of FIG. 18 of the barrier member showing also a tension spring that holds it in retracted position in the slide.
Figure 20:
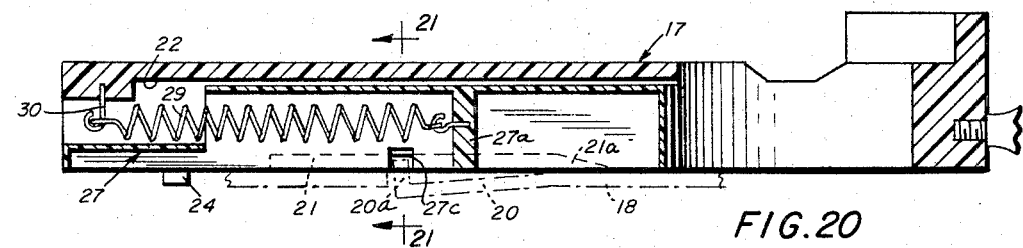
FIG. 20 is a side elevational sectional view of dispensing slide of FIG. 17 with barrier member of FIG. 19 mounted therein, tension spring attached and releasable catch for the barrier member shown in broken lines.
Figure 21:
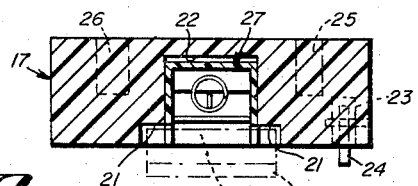
FIG. 21 is a sectional view along line 21—21 of FIG. 20.
Figure 22:
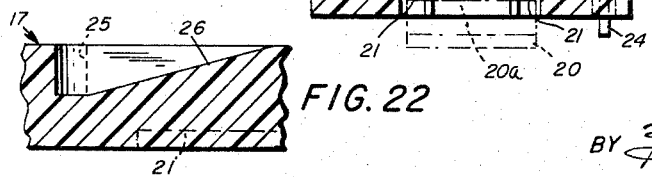
FIG. 22 is a sectional view along line 22—22 of FIG. 16 showing a camming ramp.

In the base there is provided a row of pockets 19, see FIGS. 4, 14 and 15, that cooperate with a pivoted detent 24 mounted on the slide 17 as will be described. The slide receiving pocket portion 18 in the base 11 is formed with a tongue 20, see FIG. 4, having a lip 20a that cooperates with a barrier member 27 slidable in the slide member 17, more fully described. In the slide shown in FIGS. 16, 17 and 20 there is a longitudinal recess 22 to receive the barrier member 27 and adjacent this recess 22 are oppositely disposed cam tracks 21 each having a ramp portion 21a for co-operation with the tongue member 20 and its lip 20a which are wider than the barrier member 27, see FIG. 20. In the slide 17 is a pocket 23, see FIG. 17, which receives the detent 24 that is mounted on a pivot pin 24a. Also in the slide 17 is a vertically extending aperture 25 in the top to receive the lock rod 36 as shown in FIGS. 8, 23 and 24. This lock rod 36 is coin operated as will be described. Still referring to the slide 17, FIGS. 16 and 20, there is a cam ramp 26 oppositely positioned from the lock aperture 25 that operates the vertical rod 44, see FIG. 9. This rod 44 further tilts the coin levers 35 and 42 to be described.

The barrier member 27 as shown in FIGS. 18–21 has a vertical web 27a projecting downward and an arcuate front face 27a at one end melding in with the circular portion 17a in the slide 17. Attached to the vertical web 27a is a hook 28 to which is attached the end of a tension spring 29, the other end of which is attached to a hook 30 carried by the rear end of the slide 17.

The base 11 has mounted on its top the secondary base member 31 having a rectangular upstanding collar 31a reinforced by reinforcing webs 31b to receive the tower 32 of the coin operated mechanism. At the top of this tower are oppositely disposed slots 32a for receiving lock keepers 14a therein. In the tower 32 which is of rectangular cross-sectional shape there is a coin or check chuteway, or guideway 33, for example, for dimes on one side and on the oppositely disposed side is a chuteway 40 for checks such as nickels. On the tower and cooperating with the chuteway 33 is a pivoted lever 35 for dimes mounted by a pivot pin 35a to the tower and having a check receiving portion 35b thereon at one end which cooperates with the bottom portion of the chuteway at 33a to hold a dime or check at that position as shown in FIG. 8. The other end of the lever 35 is indicated at 35c and this has pivotally attached thereto a lockrod 36 which extends vertically and has its lower end seating in the aperture 25 in the slide 17 when the slide is in out position. A spring wire 37 is anchored in the tower and extends transversely over the lever portion 35c and is of sufficient resiliency to prevent the dime from fully moving the lever 35 downward so that the dime rests on the portion 35b and against the chuteway portion 33a until the lever is further pivoted as will be explained.

The nickel chuteway 40 has a wrong coin reject passage 40a shown in FIG. 7 by illustration. The chuteway 33 for dimes likewise has such a wrong coin reject passage as shown. The lower wall portion 40b, see FIG. 6, cooperates with the lever portion 42b to hold the second deposited nickel under the setup here provided from being ejected. The first nickel is lodged against the lever 42 on its upper side and then directed by the transverse guide pin 43 into passage 40. Thus the two nickels are held on the lever 42 until further pivoted as will be explained. The lever 42 is mounted on the pivot post 42a attached to the tower 32 and its check receiving portion is indicated at 42b while the opposite portion 42c is connected to a vertical rod 44 having a transverse portion 44a pivoted to 42c and a further transverse portion 44b which extends across and under the lever portion 35c at the other side of the tower. The bottom of rod 44 rides on the ramp 26 in the slide.

*Operation*

When a dime, for example, is dropped in the slot 15 it passes down the guideway or chute 33, see FIG. 8, and lodges on the end 35b of the lever 35 and against the chute portion 33a and urges up the other end of the lever 35c against the resilient spring 37 and at the same time pulls up the lock rod 36 so that it is clear of the vertical aperture 25 in the slide 17, the slide having been in the out and locked position. The slide is now pushed inward and as it is pushed inward, see FIG. 20, the lip 20a attached to the base 11 holds the barrier member 27 in a stationary position while the slide 17 moves to the left or inward. This positions the barrier member 27 as shown in FIGS. 23 and 24, below the bottom article 50 and within the circular aperture 17b of the slide so as to prevent the bottommost article 50 from becoming jammed. As the slide 17 is pushed further inward, the tongue 20a rides on the cam portion 21 until it strikes the ramp portion 21a which moves this down and out of the slot 27c in the barrier whereupon the spring 29 pulls the barrier to the left and out from under the lowermost article 50 and from the aperture 17b in the slide permitting the bottommost article 50 to drop into the slide aperture 17b. Also as the slide 17 is moved inward, the cam ramp 26, in which the lower end of rod 44 rides, see FIG. 9, moves the rod 44 upward and tilts the lever 42 further so that it trips the dime lever 35, permitting the dime to drop into the coin receptacle 41.

If two nickels are used in the particular setup of this dispenser, they are dropped into the slot 16 and the first nickel goes through the guideway 40 and strikes the transverse guidepin 43 lodging the first nickel adjacent the upper portion of the lever 42 just to the left of the pivot portion 42a shown in FIG. 6 in a manner that does not tilt lever 42. The second nickel strikes the top portion of the first nickel and is carried over the guidepin 43 and is lodged to the left of the first nickel against the upper portion of lever end 42b and against the lower portion of guideway 40 and 40b. This tilts the lever 42 so that the cross portion 44a and 44b of the lever 44 raises up the end of lever 35c against the check retaining means 37 and the rod 36 out of the lock pocket or aperture 25 in the slide and permits the slide to be unlocked. Here again, the slide is moved inward, and, as it does, the barrier becomes released as explained before, and the bottom end of rod 44 rides in rampway 26 to further tilt the lever 42 and drop the two nickels into the coin receptacle 41.

The wrong coin reject passage 40a is above the passage leading to check receiving pivoted arm connected with the lock means thus a wrong coin inserted into the guideway is rejected before it can enter the lower portion of guideway 40 so as not to act on lever 42.

There has here been provided a very useful vending machine for small articles of different sorts that may be selected by rotary movement of the storage receptacle 12 into dispensing position. The dispenser slide is positive acting and the barrier member 27 provides for the antijamming feature of the article to be dispensed until the receptacle to receive the article in the slide 17a is fully lined up with the article to be received therein.

The detent 24 on the slide cooperating with the spaced recesses 19 in the base, namely the bottom of the slide portion 18 of the base, permits movement of the slide in one direction only, until it goes to the full extent of that movement and then the detent pivots and permits the slide to move only to the full extent of the reverse direction. This prevents tampering with the vending machine. The structure provides for fabrication from various materials and particularly from plastic material and therefore affords quantity and economical fabrication.

We claim as our invention:

1. A check operated vending machine for articles, comprising, in combination, a base, a slide mounted on the base and having receiving means thereon for an article to be dispensed, said slide being movable between an in position to receive an article to an out position to dispense said article, a storage for articles to be dispensed mounted on the base for positioning each article for movement into position above the receiving means on the slide, means on the slide cooperating with means on the base to prevent reverse movement of the slide until moved to the extreme slide position in direction of movement, check actuated lock means operatively associated with the base and the slide to lock said slide in an outward position with respect to said storage for articles, said check actuated lock means having operably connected thereto a check receiving means thereon and being responsive to the presence of a check on the check receiving means to move the lock means from locked position with respect to said slide and to hold the check thereon, a check collecting means adjacent said check receiving means, means responsive to inward movement of the slide and cooperating with said lock means to move the lock means and check receiving means to a check releasing position whereby the check receiving means is moved to release said check to said check collecting means and on movement of the slide inward to the article receiving position said slide receiving means receives an article and on movement of the slide outward with the article said lock means resumes its position locking said slide in an outward position, said check actuated lock means and check receiving means operably connected thereto comprising a mounting means on the base, a lever pivoted to the mounting means, a check slot and passage on the mounting means leading to guide a check onto said lever on one side of its pivotal mounting, a rod pivotally connected to the lever to the other side of its pivoted mounting and depending to engage in an aperture in said slide, and a second rod adjacent said first rod, means on said second rod upper end operably connecting it with said lever, said second rod lower end riding on said means on the slide whereby said second rod is moved up as said slide is moved inward and said lever is moved further causing said check receiving means thereon to move permitting said check to drop into said check collecting means.

2. A check operated vending machine according to claim 1 including a second lever pivoted on said mounting means and having a check receiving means thereon, a second check slot and passage on the mounting means leading to guide a check onto said check receiving means on said second lever on one side of its pivoted mounting, the other end of said lever being pivotally connected to said means on the upper end of said second rod connecting it with said first lever, whereby on insertion of a check in said last mentioned slot and passage, said second lever is pivoted to move said means on the upper end of said second rod connecting it with the first lever causing said lock means to unlock said slide and movement inward of said slide from its outward locked position causes said second lever to pivot further permitting release of said check on the check receiving means on the second lever so that the check slides into said coin collecting means.

3. A check operated vending machine according to 1 wherein said slide is mounted in said base, said base having an aperture therethrough communicating with the storage for articles thereabove and leading to said receiving means on said slide therebelow, a barrier slidably mounted on said slide and in one position protruding into said aperture in the slide, said barrier having lock means thereon, bias means connecting the slidable barrier to the slide urging it away from said aperture, releasable lock means cooperating with lock means on the barrier and holding the barrier in said one protruding position against said biasing means and in said aperture in the slide to prevent an article from moving through the aperture in the base, means on said slide for releasing said releasable lock means from said lock means on the barrier as said slide is moved to its inward position whereupon said bias means pulls the barrier from the aperture in said base permitting an article to drop onto said slide.

4. A check operated vending machine according to claim 1 including a second lever, pivotal mounting means mounting the second lever on said mounting means, said second lever having two check receiving means thereon, the first check receiving means positioned to one side of its pivotal mounting and the second positioned adjacent the first, a second slot and passage on the mounting means leading to guide checks to said check receiving means, a barrier means in said guideway positioned above said second lever to intercept a first coin dropped in said second slot and direct it to lodge on said first check receiving means on the second lever in a position adjacent the second lever pivotal mounting means and not tilting the second lever, the other end of said second lever on the other side of its pivotal mounting means being pivotally connected to said means on the upper end of said second rod connecting it with said first lever, whereby on insertion of a second check in said second slot, the second check strikes the top portion of said lodged first check and is carried over the barrier means in said check guideway and is lodged against the second check receiving means on the second lever and an adjacent portion of the check guideway whereupon said second lever is tilted by the weight of the second check thereon and in turn said first lever is moved causing said lock means to unlock said slide and movement inward of said slide from its outward locked position causes said second lever to pivot further permitting release of said first and second checks lodged on the check receiving means on the second lever so that said last mentioned checks slide into said coin collecting means.

5. A check operated vending machine for articles, comprising, in combination, a base, a slide mounted on the base and having receiving means thereon for an article to be dispensed, said slide being movable between an in position to receive an article to an out position to dispense said article, a storage for articles to be dispensed mounted on the base for positioning each article for movement into position above the receiving means on the slide, means on the slide cooperating with means on the base to prevent reverse movement of the slide until moved to the extreme slid position in direction of movement, check actuated lock means operatively associated with the base and the slide to lock said slide in an outward position with respect to said storage for articles, said check actuated lock means having operably connected thereto a check receiving means thereon and being responsive to the presence of a check on the check receiving means to move the lock means from locked position with respect to said slide and to hold the check thereon, a check collecting means adjacent said check receiving means, means responsive to inward movement of the slide and cooperating with said lock means to move the lock means and check receiving means to a check releasing position whereby the check receiving means is moved to release said check to said check collecting means and on movement of the slide inward to the article receiving position said slide receiving means receives an article and on movement of the slide outward with the article said lock means resumes its position locking said slide in an outward position, said base having an aperture therethrough communicating with the storage for articles thereabove and leading to said receiving means on said slide, and a barrier member slidably mounted on said slide and in one position protruding with respect to said receiving means on said slide to prevent an article from being received by said receiving means on the slide, bias means connected to the slidable barrier member urging it away from said receiving means on the slide, releasable lock means on the base cooperating with lock means on the barrier member and holding the barrier member in said one protruding position to prevent an article from being received by said receiving means on the slide, means on said slide cooperating with said releasable lock means on the base to actuate the same and release said barrier member when said slide is moved fully inward whereupon the bias means pulls the barrier member from said protruding position and an article falls into position on said slide for dispensing on further pulling outward of said slide.

6. A check operated vending machine for articles, comprising, in combination, a base, a slide mounted on the base and having receiving means thereon for an article to be dispensed, said slide being movable between an in position to receive an article to an out position to dispense said article, a storage for articles to be dispensed mounted on the base for positioning each article for movement into position above the receiving means on the slide, means on the slide cooperating with means on the base to prevent reverse movement of the slide until moved to the extreme slid position in direction of movement, check actuated lock means operatively associated with the base and the slide to lock said slide in an outward position with respect to said storage for articles, said check actuated lock means having operably connected thereto a check receiving means thereon and being responsive to the presence of a check on the check receiving means to move the lock means from locked position with respect to said slide and to hold the check thereon, a check collecting means adjacent said check receiving means, means responsive to inward movement of the slide and cooperating with said lock means to move the lock means and check receiving means to a check releasing position whereby the check receiving means is moved to release said check to said check collecting means and on movement of the slide inward to the article receiving position said slide receiving means receives an article and on movement of the slide outward with the article said lock means resumes its position locking said slide in an outward position, and a movable article barrier member associated with said storage for articles to be dispensed and said receiving means on the slide, said barrier member having a first position holding an article from entry into said receiving means on the slide until said article receiving means moves to the in position to receive an article, and a second position wherein it is moved from its article holding position to an article released position, biasing means for the barrier to move it from its first to its second position, holding means for the barrier holding it in its first position, release means for said barrier holding means operatively associated with said slide to release said barrier holding means when said slide is moved inwardly to said article receiving position and means operatively associated with said slide and said barrier to move the barrier to said first position when said slide is moved to said out position.

References Cited

UNITED STATES PATENTS

| | | | |
|---|---|---|---|
| 393,149 | 11/1888 | Gates | 221—122 XR |
| 417,354 | 12/1889 | Crepeau | 194—39 |
| 447,267 | 2/1891 | Wood | 194—39 |
| 489,830 | 1/1893 | Poff | 194—39 |
| 2,101,420 | 7/1937 | Scofield | 221—122 XR |
| 2,309,674 | 2/1943 | Schloff | 221—122 |
| 2,759,632 | 7/1956 | Ussery et al. | 221—156 XR |

FOREIGN PATENTS 648,865  11/1962  Italy.

WALTER SOBIN, *Primary Examiner.*